Aug. 11, 1925.
A. B. CARLSON
TOY WAGON
Filed Sept. 6, 1924
1,549,295
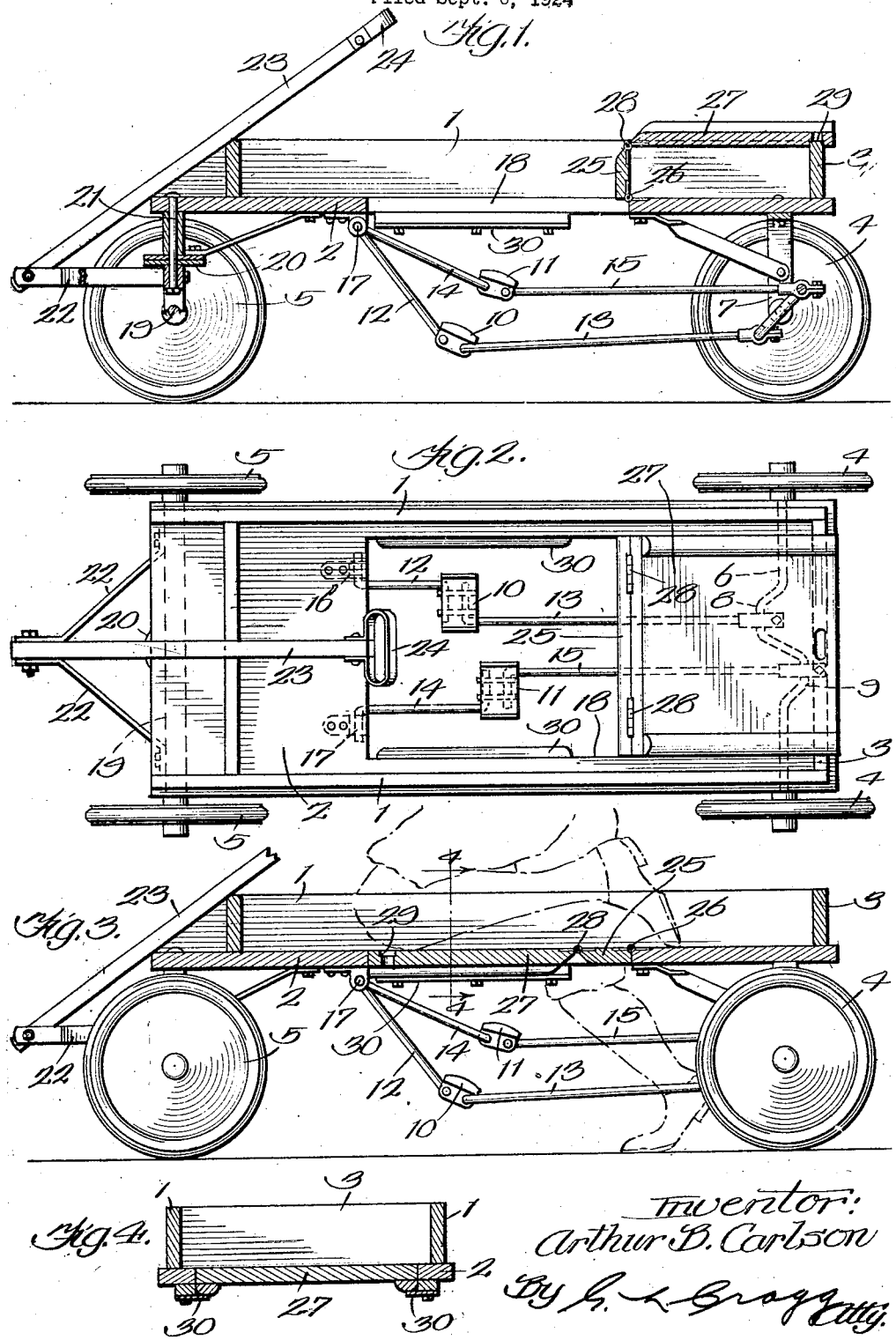

Patented Aug. 11, 1925.

1,549,295

UNITED STATES PATENT OFFICE.

ARTHUR B. CARLSON, OF KENILWORTH, ILLINOIS.

TOY WAGON.

Application filed September 6, 1924. Serial No. 736,219.

*To all whom it may concern:*

Be it known that I, ARTHUR B. CARLSON, a citizen of the United States, residing at Kenilworth, in the county of Cook and the State of Illinois, have invented a certain new and useful Improvement in Toy Wagons, of which the following is a full, clear, concise, and exact description.

My invention relates to toy wagons and has for its object the construction of a wagon which may be adjusted to enable it to be either pedal operated or pushed from one side by the occupant's foot.

The floor of the body of my improved wagon is formed with a section that may be opened to leave a passage through the floor for the feet of the occupant to reach the pedals; there being seating space upon the wagon body back of this passage, the wagon body being of a height to permit the foot of one leg of the occupant to reach and push upon the ground while the occupant is kneeling with the other leg upon the floor when said floor section is closed, and a steering hand lever operatively coupled with the steering vehicle wheel portion of the wagon and accessible to the hands of the occupant either when sitting upon the wagon or so kneeling upon the floor. In the preferred embodiment of the invention, the movable floor section is so related to the balance of the wagon body as to constitute a seat for the occupant while operating the pedals.

The invention will be more fully explained in connection with the accompanying drawing in which Fig. 1 is a longitudinal sectional view of the wagon of my invention as it is preferably constructed, the wagon being here shown as adjusted to be pedal operated; Fig. 2 is a plan view of the wagon as it appears in Fig. 1; Fig. 3 is a view, partially in longitudinal section and partially in elevation, showing the wagon adjusted to be pushed from one side by the occupant's foot; and Fig. 4 is a sectional view on line 4—4 of Fig. 3.

The wagon illustrated includes a body portion 1 having a floor 2 and a tail board 3. The wagon is mounted upon a propelling vehicle wheel portion including, preferably, two wheels 4 and a steering vehicle wheel portion also preferably including two wheels 5. The propelling vehicle wheels 4 are provided with an axle 6 which is journaled in bearings 7 that are carried by and beneath the wagon body. The axle 6 is formed with offset portions 8 and 9 which are displaced 180° equally upon opposite sides of the axis of the axle, the offset portions 8 and 9 constituting cranks. Pedals 10, 11 serve to flexibly connect the links 12, 13 of one set and the links 14, 15 of another set respectively, the links 13 and 15 being journaled at their rear ends upon the cranks 8 and 9 respectively and the links 12 and 14 being journaled at their forward ends in the bearings 16 and 17 respectively. The floor of the wagon body has a passage 18 located above the pedals to permit the feet of the occupant to reach the pedals, there being seating space for the occupant at the rear of this passage.

The steering vehicle wheels 5 are mounted to turn upon an axle 19 which is in supporting relation to a fifth wheel structure 20 which is assembled with the wagon body by means of a king bolt 21, according to common practice. The axle carries a bracket 22 that projects forwardly therefrom. Some suitable form of hand lever, such as the lever bar 23, is connected with the bracket at the forward end thereof and terminates at its other end in some suitable means by which it may be grasped, such as the looped handle 24. The steering lever 23 is preferably freely pivoted upon the forward end of the bracket so that the lever may be pulled forwardly to enable the wagon to be drawn or may be adjusted rearedly to the position illustrated to be within reach of the occupant's hand. The floor of the wagon body is made to include a movable section which may cover the passage 18. This floor section is desirably inclusive of a rear panel portion 25 that is hinged at its rear transverse edge to the contiguous portion of the floor, as indicated at 26. The front panel portion 27 of the adjustable floor section is in hinge connection with the panel portion 25 as indicated at 28. When the wagon is being pedaled, the adjustable floor section is arranged as indicated in Figs. 1 and 2 in order that the front panel portion 27 thereof may overlie the rear portion of the floor and the tail board to constitute a seat which is elevated by the tail board and the panel portion 25 sufficiently to comfortably adjust the feet of the occupant to the pedals and to place the occupant within reach of the steering lever. The end of the panel portion 27 which overlies the tail board is preferably formed with a notch 29 that receives the top margin of the tail board to preserve the formation of the seat. When the wagon is to be pushed from one side by the foot of the occupant, the adjustable floor section is lowered and placed in the same plane with the balance of the floor, as indicated in Fig. 3, where the front panel portion 27 of the adjustable floor section is shown as resting upon the ledges 30, that are arranged alongside of and beneath the side margins of the passage 18. The wagon body is of such a height, as indicated in Fig. 3, as to permit the foot of one leg of the occupant to reach and push upon the ground while the occupant is kneeling with the other leg upon the completed floor. The steering hand lever is still within the reach of the occupant's hands as it was when the wagon was being pedaled.

The wagon of my invention is of particular utility, being readily convertable from a pedal operated vehicle to one which may be pushed from one side of the vehicle.

Changes may be made without departing from my invention.

Having thus described my invention, I claim:—

In a toy wagon, the combination with the body thereof having a floor and a tail board; of propelling and steering vehicle wheel portions upon which said body is mounted; mechanism for driving the propelling vehicle wheel portion and including operating pedals beneath the floor, this floor being formed with a section that may be opened and whose forward end may be rested upon the tail board to form a seat upon the body and leave a passage through the floor for the feet of the occupant to reach the pedals, said section including a rear panel to which the balance of the section is hinged and serving to elevate the other panel of the seat above the floor, the wagon body being of a height to permit the foot of one leg of the occupant to reach and push upon the ground while the occupant is kneeling with the other leg upon the floor when said floor section is closed; and a steering hand lever operatively coupled with the steering vehicle wheel portion of the wagon and accessible to the hands of the occupant either when sitting upon the wagon or so kneeling upon the floor.

In witness whereof, I hereunto subscribe my name.

ARTHUR B. CARLSON.